(12) United States Patent
Nakagawa

(10) Patent No.: US 10,597,037 B2
(45) Date of Patent: Mar. 24, 2020

(54) CONTROL SYSTEM AND VEHICLE

(71) Applicant: YAMAHA HATSUDOKI KABUSHIKI KAISHA, Iwata-shi, Shizuoka-ken (JP)

(72) Inventor: Yoshitomi Nakagawa, Shizuoka (JP)

(73) Assignee: YAMAHA HATSUDOKI KABUSHIKI KAISHA, Iwata-shi, Shizuoka-ken (JP)

( * ) Notice: Subject to any disclaimer, the term of this patent is extended or adjusted under 35 U.S.C. 154(b) by 50 days.

(21) Appl. No.: 15/854,577

(22) Filed: Dec. 26, 2017

(65) Prior Publication Data

US 2018/0178805 A1 Jun. 28, 2018

(30) Foreign Application Priority Data

Dec. 28, 2016 (JP) ................... 2016-254712

(51) Int. Cl.
| | |
|---|---|
| *B60W 30/19* | (2012.01) |
| *B60W 10/06* | (2006.01) |
| *B60W 10/02* | (2006.01) |
| *B60W 30/18* | (2012.01) |
| *B60W 50/14* | (2020.01) |
| *F16H 61/04* | (2006.01) |
| *F16H 63/46* | (2006.01) |
| *F16H 63/50* | (2006.01) |

(52) U.S. Cl.
CPC ............ *B60W 30/19* (2013.01); *B60W 10/02* (2013.01); *B60W 10/06* (2013.01); *B60W 30/18109* (2013.01); *B60W 50/14* (2013.01); *F16H 61/0403* (2013.01); *F16H 63/46* (2013.01); *F16H 63/502* (2013.01); *B60W 2510/1005* (2013.01); *B60W 2510/18* (2013.01); *B60W 2520/105* (2013.01); *B60W 2710/021* (2013.01); *F16H 2061/0492* (2013.01); *F16H 2061/0496* (2013.01)

(58) Field of Classification Search
CPC ....... B60W 30/19; B60W 10/02; B60W 10/06
See application file for complete search history.

(56) References Cited

U.S. PATENT DOCUMENTS

| | | | |
|---|---|---|---|
| 2008/0115984 A1 | 5/2008 | Watanabe |
| 2008/0119324 A1 | 5/2008 | Watanabe |
| (Continued) |

FOREIGN PATENT DOCUMENTS

| | | |
|---|---|---|
| EP | 0697302 A2 | 2/1996 |
| EP | 1136307 A2 | 9/2001 |
| (Continued) |

*Primary Examiner* — Stacey A Fluhart
(74) *Attorney, Agent, or Firm* — Rabin & Berdo, P.C.

(57) ABSTRACT

A control part controls a clutch actuator. The control part has a first shift mode and a second shift mode. In the first shift mode, the clutch is switched to the disengaged state before changing of the gear position and the clutch is switched to the engaged state after changing of the gear position. In the second shift mode, an output of the prime mover is adjusted while the clutch is kept in the engaged state during the shift operation. Either the first shift mode or the second shift mode is selected on the basis of a detection result on whether the shift operation is a shift-up operation or a shift-down operation, and a traveling state of the vehicle.

6 Claims, 10 Drawing Sheets

(56) References Cited

U.S. PATENT DOCUMENTS

| | | | | |
|---|---|---|---|---|
| 2013/0147806 A1* | 6/2013 | Malkin | ................. | G06Q 40/00 345/440 |
| 2013/0157806 A1* | 6/2013 | Koyama | ............... | B60W 20/30 477/5 |
| 2018/0178805 A1* | 6/2018 | Nakagawa | ............ | B60W 30/19 |

FOREIGN PATENT DOCUMENTS

| | | |
|---|---|---|
| EP | 2716941 A1 | 4/2014 |
| JP | 2813009 B2 | 10/1998 |
| JP | 2005-106246 A | 4/2005 |
| JP | 2011-196432 A | 10/2011 |
| JP | 4950954 B2 | 6/2012 |
| JP | 4958238 B2 | 6/2012 |
| JP | 5041974 B2 | 10/2012 |
| WO | WO-2006-004008 A1 | 1/2006 |

* cited by examiner

CONTROL SYSTEM AND VEHICLE

CROSS REFERENCE TO RELATED APPLICATION

The disclosure of Japanese Patent Application No. 2016-254712 filed on Dec. 28, 2016 including specification, drawings and claims is incorporated herein by reference in its entirety. The benefit of the earlier filing date of the noted application is hereby claimed.

TECHNICAL FIELD

The present invention relates to a vehicle having a manual transmission that changes a gear position by a shift operation of a driver and a control system for controlling the vehicle in which a rotational force output from a prime mover such as an engine or an electric motor to a drive wheel is transmitted through the manual transmission.

BACKGROUND

In the case where gear shift is performed in the vehicle equipped with the engine and the manual transmission, the driver usually disengages a clutch. Thus, the rotational force generated by the engine is stopped from a crankshaft of the engine to a main axis of the manual transmission, thereby facilitating the separation of a gear and a dog. In the cut state where the clutch is disengaged, the driver performs the shift operation and changes the gear position. Finally, the driver engages the clutch to transmit the rotational force from the crankshaft to the main axis. This completes the gear shift.

If the output of the engine is appropriately adjusted at the time of the gear shift, the gear shift is performed without the clutch operation by the driver described above (hereinafter referred to as "no-clutch operation") and a high operability is obtained. A control technique for automatic changing of the gear position with the no-clutch operation in the vehicle is proposed. For example, in the vehicle according to Japanese Patent No. 5041974, a shift up of the gear position is smoothly carried out by lowering the output of the engine in the drive state which is transmitted from the engine to the manual transmission. Conversely, the gear position is smoothly shifted by increasing the output of the engine in the driven state which is transmitted from the manual transmission to the engine from the manual transmission.

As described above, the shift up when a driving area of the vehicle is in the traveling state and the shift down when the driving condition is driven can be controlled favorably. However, the control of changing the gear positions in the other driving areas is not always easy, and it is very difficult to smoothly change the gear positions with the no-clutch operation for the shift down during the acceleration and for the shift up during the deceleration as the shift operation by the driver. Therefore, in such a case, a technology capable of smoothly performing shift operation with the no-clutch operation is desired.

SUMMARY

This invention was developed in view of the above problem and an object thereof is to provide a control system capable of smoothly changing gear positions with a high operability and a vehicle having the control system.

According to a first aspect of the disclosure, there is provided a control system of a vehicle which transmits a rotation force outputted from a prime mover to a drive wheel through a manual transmission that changes a gear position by a shift operation of a driver. The system comprises: a clutch provided between the prime mover and the manual transmission in a transmission path of the rotation force; a clutch actuator that engages and disengages the clutch; and a control part that controls the clutch actuator to switch between an engaged state where the clutch is engaged and a disengaged state where the clutch is disengaged, wherein the control part has: a first shift mode in which the clutch is switched to the disengaged state before changing of the gear position and the clutch is switched to the engaged state after changing of the gear position; and a second shift mode in which an output of the prime mover is adjusted while the clutch is kept in the engaged state during the shift operation, and either the first shift mode or the second shift mode is selected on the basis of a detection result on whether the shift operation is a shift-up operation or a shift-down operation, and a traveling state of the vehicle.

According to a second aspect of the disclosure, there is provided a vehicle which travels by transmitting a rotation force outputted from a prime mover to a drive wheel through a manual transmission that changes a gear position by a shift operation of a driver. The vehicle comprises a control system that controls the vehicle, wherein the control system has: a clutch provided between the prime mover and the manual transmission in a transmission path of the rotation force, a clutch actuator that switches between an engaged state where the clutch is engaged and a disengaged state where the clutch is disengaged; and a control part that controls the clutch actuator to switch between an engaged state where the clutch is engaged and a disengaged state where the clutch is disengaged, wherein the control part has: a first shift mode in which the clutch is switched to the disengaged state before changing of the gear position and the clutch is switched to the engaged state after changing of the gear position; and a second shift mode in which an output of the prime mover is adjusted while the clutch is kept in the engaged state during the shift operation, and either the first shift mode or the second shift mode is selected on the basis of a detection result on whether the shift operation is a shift-up operation or a shift-down operation, and a traveling state of the vehicle.

In the invention configured as above, as the shift mode corresponding to the shift operation of the driver, the first shift mode and the second shift mode are provided. The first shift mode is accompanied with switching of the clutch by the clutch actuator, and the second shift mode keeps engagement of the clutch. Then, when the driver performs a shift operation, the shift mode is selected in accordance with the detection result on whether the shift operation is the shift-up operation or the shift-down operation and the traveling state of the vehicle, and changing of the gear position is excellently performed.

According to the present invention, since the shift mode is selected on the basis of the detection result on whether the shift operation of the driver is the shift-up operation or the shift-down operation, and the traveling state of the vehicle, it is possible to change the gear position with high operability and smoothness.

The above and further objects and novel features of the invention will more fully appear from the following detailed description when the same is read in engagement with the accompanying drawing. It is to be expressly understood, however, that the drawing is for purpose of illustration only and is not intended as a definition of the limits of the invention.

DETAILED DESCRIPTION

A. The First Embodiment

Figure 1A:
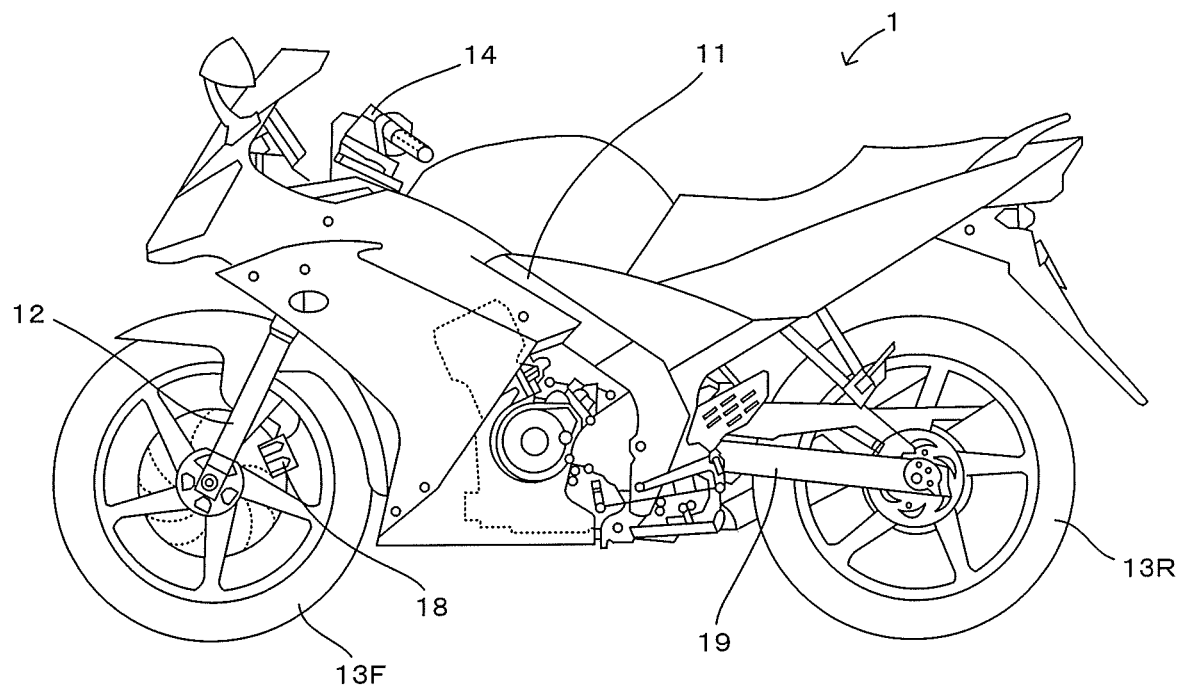
FIG. 1A is an external side view showing a motorcycle which is an exemplary vehicle in accordance with a first embodiment of the present invention.
Figure 1B:
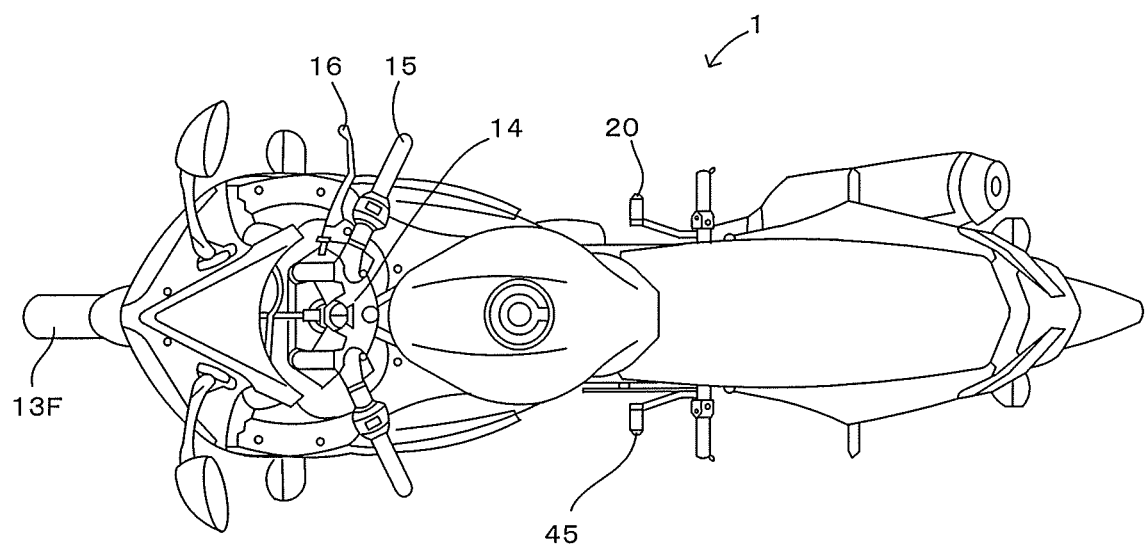
FIG. 1B is a plan view showing the motorcycle of FIG. 1A.
Figure 2:
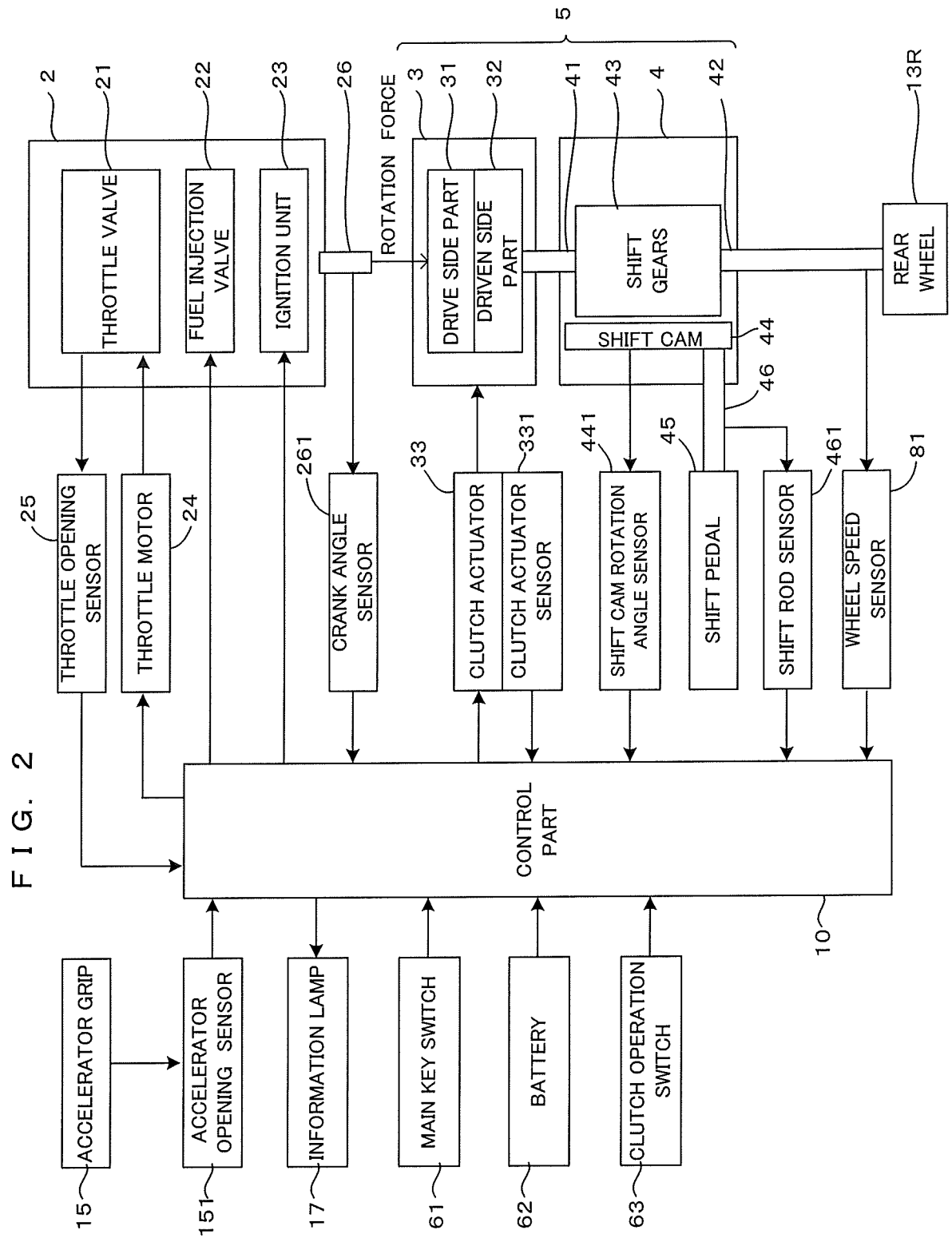
FIG. 2 is a block diagram showing a constitution of principal part of the motorcycle shown in FIG. 1A.

FIG. 1A is an external side view showing a motorcycle which is an exemplary vehicle in accordance with a first embodiment of the present invention. FIG. 1B is a plan view showing the motorcycle of FIG. 1A. FIG. 2 is a block diagram showing a constitution of principal part of the motorcycle shown in FIG. 1A. In the following description, "front", "rear", "left", and "right" mean the front, the rear, the left, and the right as viewed from a driver sitting on a seat of the motorcycle 1, respectively.

In the motorcycle 1, a head tube (not shown) is provided at a front end of a main body frame 11. This head tube is provided with a left and right pair of front forks 12 swingably. A front wheel 13F is supported rotatably at a lower end of the front forks 12. Further, a handle 14 is attached to an upper end of the head tube.

The handle 14 is provided with an accelerator grip 15, a brake lever 16 and an information lamp 17 (FIG. 2). The accelerator grip 15 is provided with an accelerator opening sensor 151, which detects a manipulated variable (hereinafter, referred to as an "accelerator opening") of the accelerator grip 15 by the driver. When the driver operates the brake lever 16, a front wheel brake 18 attached to a lower end portion of the front forks 12 brakes rotation of the front wheel 13F. The information lamp 17 has a function of informing the driver of various information as described later.

Inside the main body frame 11, an engine 2, a clutch 3, a manual transmission 4, and the like are arranged. A rotation force (torque) generated by the engine 2 is transmitted to a rear wheel 13R through a power transmission path 5. In this power transmission path 5, the clutch 3 and the manual transmission 4 are incorporated, and the above rotation force is transmitted to the clutch 3 and the manual transmission 4 in this order and given to the rear wheel 13R. The rear wheel 13R is held rotatably by a rear arm 19 extended rearward from a rear end portion of the main body frame 11, and driven by the rotation force transmitted through the power transmission path 5. In the present embodiment, in order to detect a wheel speed which is a rotation speed of the rear wheel 13R driven thusly, a wheel speed sensor 81 (FIG. 2) is provided. As the wheel speed sensor 81, a sensor which directly detects the rotation speed of the rear wheel 13R may be used, or another sensor which detects a rotation speed of a drive shaft 42 described later may be used. Further, in order to brake the rotation of the rear wheel 13R, as shown in FIG. 1B, a brake pedal 20 is provided and a rear wheel brake (not shown) is operated with an operation of the brake pedal 20 by the driver.

The engine 2 has a throttle valve 21, a fuel injection valve 22, and an ignition unit 23. To the throttle valve 21, a throttle motor 24 is connected. By operating the throttle motor 24 in accordance with a command from a control part 10 which controls constituent elements of the motorcycle 1 in accordance with a program designed in advance, a throttle opening of the throttle valve 21 can be controlled. The throttle opening is detected by a throttle opening sensor 25, and the detection result is given to the control part 10 as information relating to the throttle opening (hereinafter, referred to as "throttle opening information"). Besides the throttle opening information, information relating to the accelerator opening (hereinafter, referred to as "accelerator opening information") is given to the control part 10. Specifically, when the driver operates the accelerator grip 15, the accelerator opening sensor 151 detects the manipulated variable thereof and the detection result is given to the control part 10 as the accelerator opening information. Then, on the basis of the throttle opening information and the accelerator opening information, the control part 10 controls the throttle motor 24 to control the throttle opening.

The fuel injection valve 22 injects fuel into the engine 2, and the amount of fuel to be injected is set in accordance with the accelerator opening and the like. The ignition unit 23 operates at a predetermined ignition timing in an engine cycle. Specifically, the ignition unit 23 causes a spark discharge inside the engine 2, to thereby ignite a mixture of fuel and air. A rotation force to drive the rear wheel 13R is thereby generated. The rotation force is given to the power transmission path 5 through a crankshaft 26. Further, reference numeral 261 in FIG. 2 represents a crank angle sensor for detecting rotation of the crankshaft 26 in the engine 2. For example, a rotation pulse generation unit for generating a rotation pulse in accordance with the amount of rotation, with the rotation of the crankshaft 26, can be used as the crank angle sensor 261. In other words, the control part 10 can obtain an engine rotation speed on the basis of the rotation pulse.

Inside the power transmission path 5, the clutch 3 is disposed at a position closest to the engine 2. In other words, the clutch 3 is arranged between the engine 2 and the manual transmission 4. The clutch 3 has a drive side part 31 and a driven side part 32, and the drive side part 31 and the driven side part 32 are so configured as to be brought closer to and away from each other by a clutch actuator 33. Further, in order to detect the position of an actuator of the clutch actuator 33, a clutch actuator sensor 331 is provided. A detection result obtained by the clutch actuator sensor 331 is given to the control part 10 as information indicating a switching state between engagement and disengagement of the clutch 3.

In the clutch 3 configured as above, a torque (engine torque) generated by the engine 2 is inputted to the drive side part 31. More specifically, the rotation of the crankshaft 26 in the engine 2 is transmitted to the drive side part 31. Further, between the crankshaft 26 and the drive side part 31, a reduction gear may be provided. On the other hand, the driven side part 32 is connected to a main shaft 41 of the manual transmission 4.

The manual transmission 4 has the main shaft 41, a drive shaft 42, a plurality of shift gears 43, a shift cam 44, a shift pedal 45, and a shift arm 46. The shift gears 43 are arrangeable at a plurality of gear positions corresponding to a plurality of shift stages, respectively. The gear positions include, for example, a plurality of forward gear positions and at least one reverse gear position. Rotation of the main shaft 41 is converted into rotation of a gear ratio and a direction in accordance with the gear position, to be transmitted to the drive shaft 42. The drive shaft 42 is mechanically coupled with the rear wheel 13R.

The shift cam 44 has a function of changing the arrangement of the shift gears 43 in accordance with a shift operation of the driver using the shift pedal 45, to thereby switch the gear position. In this embodiment, when the driver depresses the shift pedal 45 to be rotated clockwise (in a clockwise direction of FIG. 1A), the rotating operation rotates the shift cam 44 through the shift arm 46. In accordance with the rotating operation, the shift gears 43 are displaced so that shift-up of the manual transmission 4 is performed. Meanwhile, in order to shift down the manual transmission 4, the shift pedal 45 should be rotated counterclockwise. The shift cam 44 is thereby rotated in the reverse direction so that the manual transmission 4 is shifted down.

Figure 3:
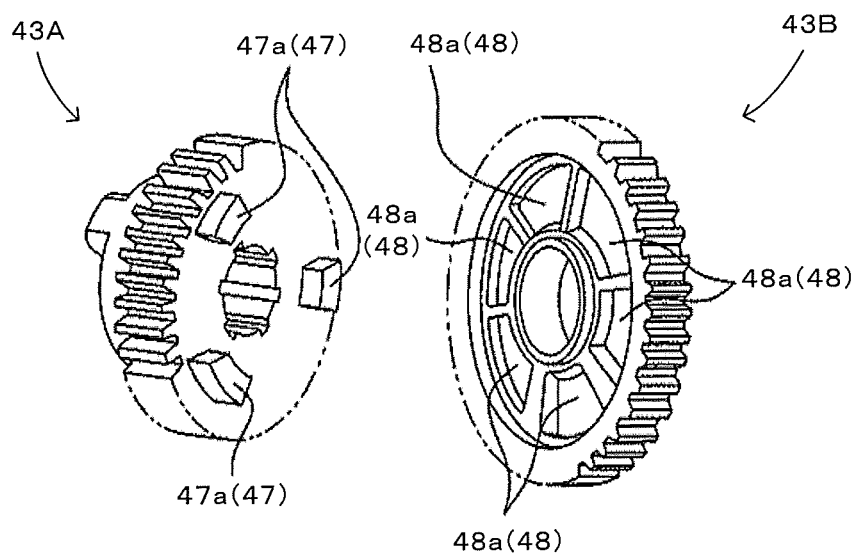
FIG. 3 is a perspective view schematically showing a structure of a dog clutch disposed between a pair of change gears equipped with a manual transmission.
Figure 4:
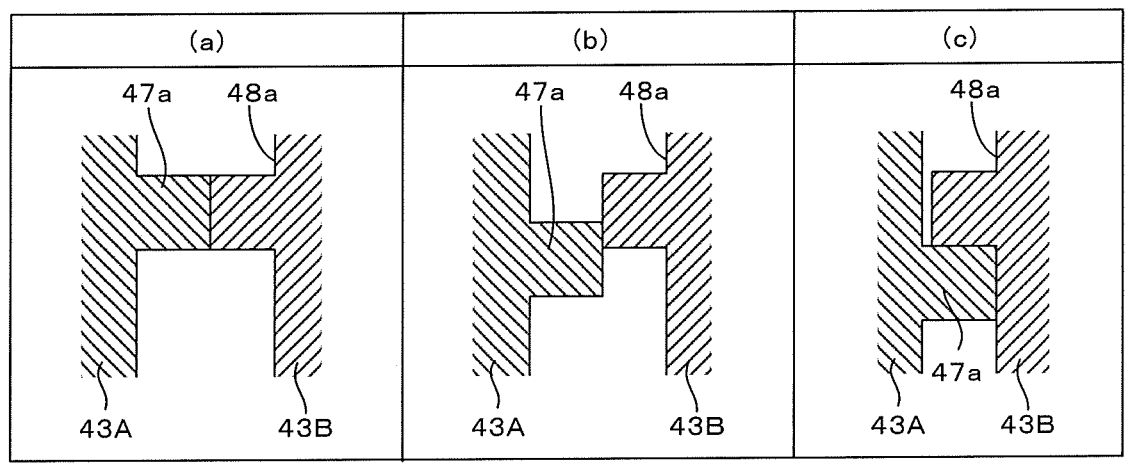
FIG. 4 is an explanatory diagram showing operations of the dog clutch during the gear shift.

Herein, with reference to FIGS. 3 and 4, description will be made on the structure of the shift gear 43 and dog contact in the displacement of the shift gears. As to shift gears 43A and 43B which are arranged adjacently to each other among the shift gears 43, one shift gear 43A is provided with a dog 47 having projections 47a and the other shift gear 43B is provided with a dog 48 having recessed portions 48a. The dog 47 has a plurality of projections 47a arranged in a shaft end face of the shift gear 43A at intervals along a circumferential direction of the shift gear 43A. On the other hand, the dog 48 has a plurality of recessed portions 48a formed in a shaft end face of the shift gear 43B, which faces the other shift gear 43A, at intervals along a circumferential direction of the shift gear 43B. The projections 47a and the recessed portions 48a each have a shape, a size, and an arrangement position which enable engagement with the counterpart. The projections 47a have the same length in the circumferential direction, and similarly the recessed portions 48a have the same length in the circumferential direction. The length of each of the recessed portions 48a in the circumferential direction is larger than that of each of the projections 47a in the circumferential direction. Therefore, the projection 47a is engaged with the recessed portion 48a with play. In other words, a dog relative angle at which the projection 47a and the recessed portion 48a are engageable with each other has a dog engagement range in accordance with the above play. The number of projections 47a may be equal to or not equal to the number of recessed portions 48a, and FIG. 3 shows an exemplary case where three projections 47a and six recessed portions 48a are provided.

One of the dog 47 and the dog 48 which are engaged with each other is a drive dog which always rotates in synchronization with the main shaft 41, and the other is a driven dog which always rotates with the drive shaft 42. Herein, as shown in the column (a) of FIG. 4, when a "dog contact" occurs, "dog contact" being a state where the dogs 47 and 48 are in contact with each other, the shift gears 43A and 43B cannot be displaced and changing of the gear position cannot be performed. When there occurs a difference in the rotation speed between the main shaft 41 and the drive shaft 42, however, the dog 47 moves relatively to the dog 48 in a rotation direction of the shift gears 43A and 43B, to thereby resolve the dog contact, as shown in the column (b) of FIG. 4. It thereby becomes possible to switch the gear position. The column (c) of FIG. 4 schematically shows a state where a "dog engagement," which is a state where the dogs 47 and 48 are engaged with each other, is made and changing of the gear position is completed.

Thus, changing of the gear position is performed by the shift operation of the driver, and in order to accurately detect the gear position, the shift cam 44 is provided with a shift cam rotation angle sensor 441 (FIG. 2). The shift cam rotation angle sensor 441 detects a rotation angle of the shift cam 44 and gives the detection result to the control part 10 as information relating to the gear position. Further, in order to accurately detect the shift operation of the driver, a shift rod sensor 461 (FIG. 2) is provided. The shift rod sensor 461 is formed of a load cell of, for example, an elastic type (a strain gauge type, an electrostatic capacitive type, or the like), a magnetostriction type, or the like, and detects a tensile load and a compressive load which are exerted on the shift rod sensor 461 and gives the detection result to the control part 10 as information indicating whether there is a shift operation or not and whether the shift operation is a shift-up operation or a shift-down operation.

The control part 10 serves as an ECU (Electronic Control Unit) and a MCU (Motor Control Unit), and is constituted of a well-known CPU (Central Processing Unit) which executes a logic operation, a ROM (Read Only Memory) which stores therein programs, initial settings, and the like, a RAM (Random Access Memory) which temporarily stores therein various data during operation of the motorcycle 1, and the like. The control part 10 is also connected to a main key switch 61, a battery 62, a clutch operation switch 63, and the like, as well as the sensors, a motor, and an actuator.

The main key switch 61 is a key switch used for conduction/cut-off operation using a main key in order to turn on power of the motorcycle 1. The battery 62 has a function of supplying power to electrical equipment such as the control part 10 and the like, and the voltage of the battery 62 is monitored by the control part 10.

The clutch operation switch 63 is a command switch to forcedly switch between engagement and disengagement of the clutch 3, and a command switch for receiving a clutch command on engagement and disengagement of the clutch 3 from the driver. It is provided to switch between engagement and disengagement of the clutch 3 in accordance with the clutch command from the driver as occasion arises. Specifically, when it is detected that the driver pressed the clutch operation switch 63, the control part 10 gives a disengagement command to the clutch actuator 33 and causes the clutch actuator 33 to disengage the clutch 3. Further, in the present embodiment, once the clutch operation switch 63 is pressed, a disengaged state where the clutch 3 is disengaged is kept. On the other hand, if it is detected that the clutch operation switch 63 is pressed again, the control part 10 gives an engagement command to the clutch actuator 33 and causes the clutch actuator 33 to engage the clutch 3. The method of switching between the engaged state (engagement) and the disengaged state (disengagement) for the clutch 3 by the operation of the clutch operation switch 63 is not limited to this, but there may be a configuration, for example, where the control part 10 causes the clutch 3 to be disconnected only while the driver presses the clutch operation switch 63.

Thus, the control part 10 controls the constituent elements of the motorcycle 1 on the basis of the information from various sensors and the program, in the present embodiment. A shift mode is selected in accordance with a content of the shift operation by the driver and a traveling state of the motorcycle 1. Hereinafter, with respect to FIGS. 5 to 7, detailed description will be made on a control of selecting the shift mode by the control part 10.

Figure 5:
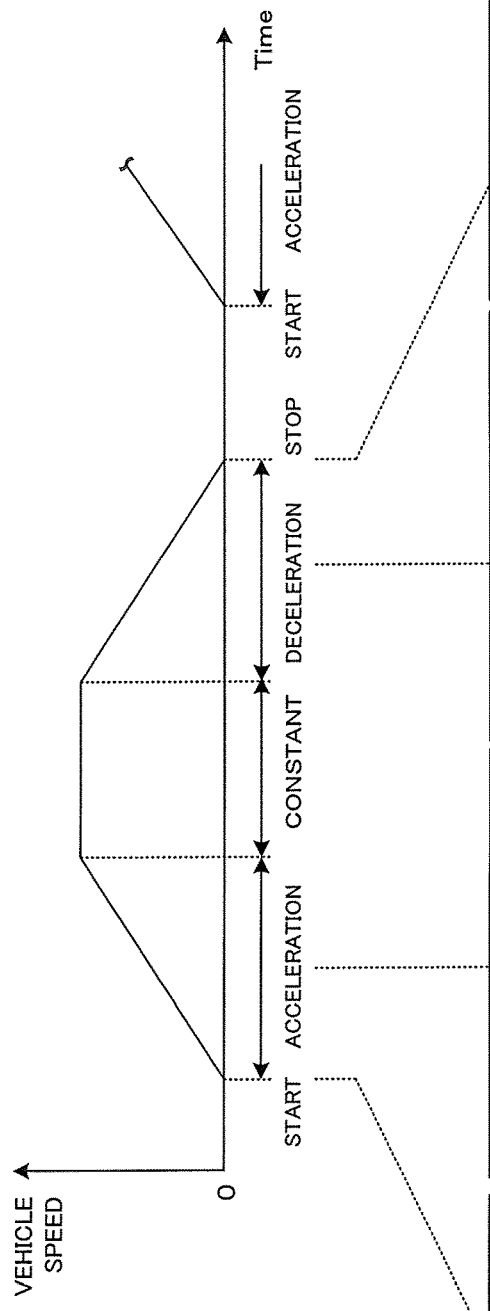
FIG. 5 is a view schematically showing an example of a traveling pattern and a shift mode of the motorcycle.
Figure 6:
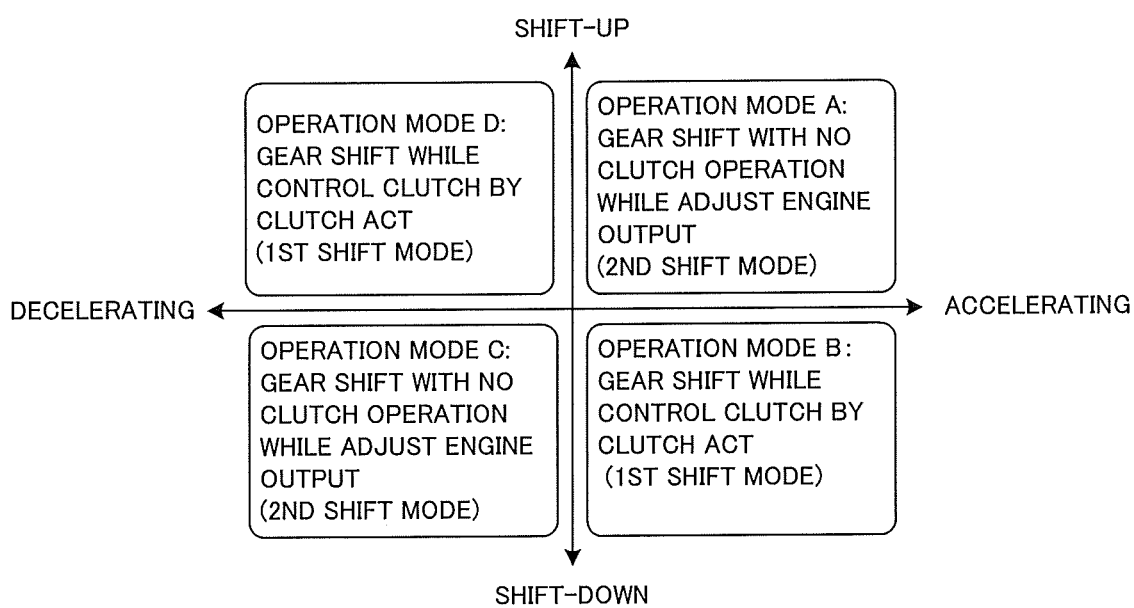
FIG. 6 is a view showing an exemplary sectionalization of operation ranges.
Figure 7:
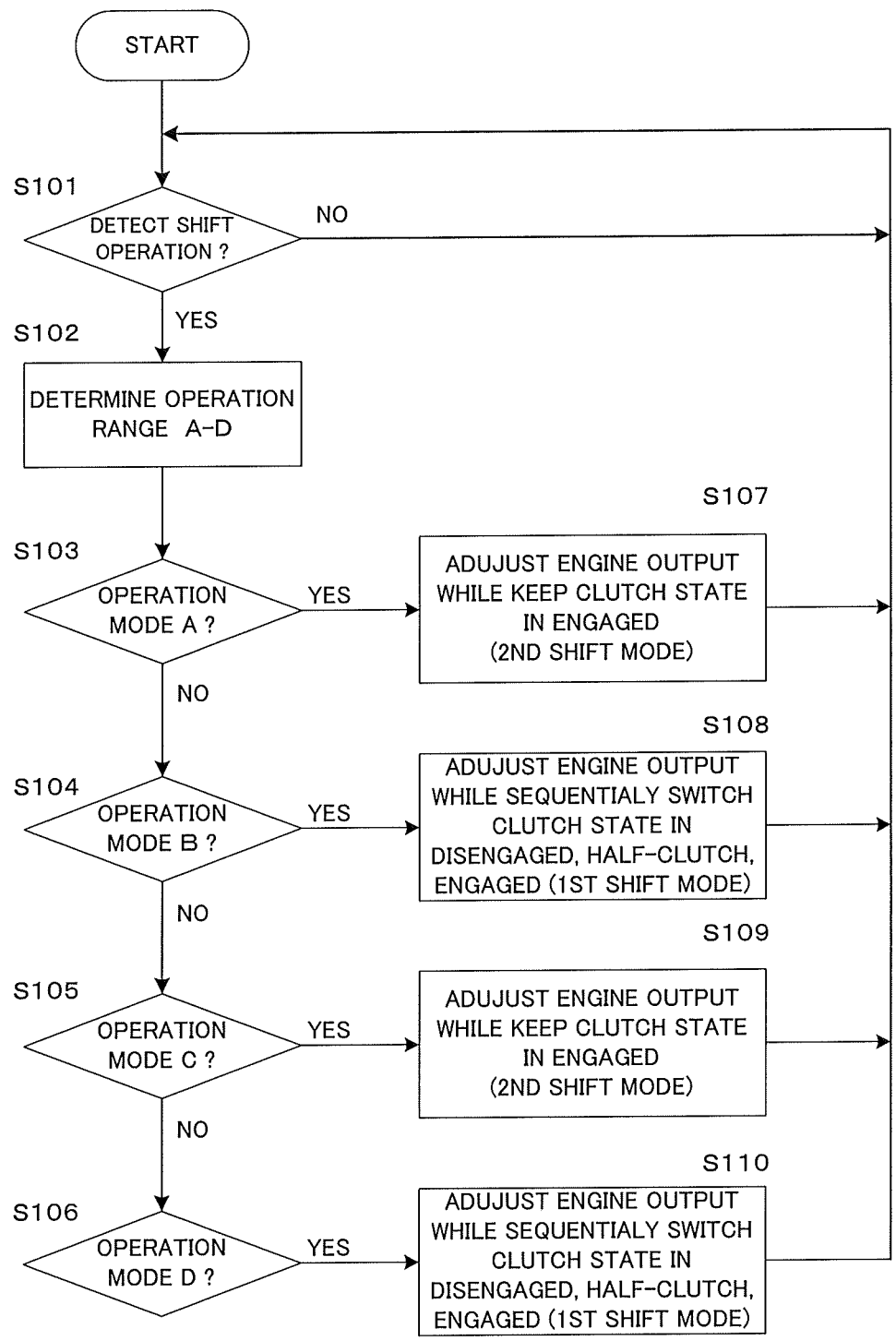
FIG. 7 is a flowchart showing the control of selecting the shift mode in accordance with a traveling state of the motorcycle.

FIG. 5 is a view schematically showing an example of a traveling pattern and a shift mode of the motorcycle. FIG. 6 is a view showing an exemplary sectionalization of operation ranges. FIG. 7 is a flowchart showing the control of selecting the shift mode in accordance with a traveling state of the motorcycle. Further, in FIG. 5, the graph shows an exemplary typical traveling pattern of the motorcycle 1 and the tables show the respective traveling states and shift modes of the motorcycle 1 at a start, during acceleration, during deceleration, and at a stop. In each table, "vehicle speed" indicates a change in a vehicle speed, "shift operation" indicates whether or not any shift operation is performed by the driver, and a content of the shift operation, "clutch" indicates engaged/disengaged states of the clutch 3, and "engine output adjustment" indicates whether or not the number of rotation of the crankshaft 26 in the engine 2 should be temporarily adjusted regardless of the operation state of the accelerator grip 15 by the driver.

As shown in FIG. 5, when the motorcycle 1 at a stop is started, the gear position of the manual transmission 4 is a first or a second which is suitable for a start. When the driver performs an operation of the accelerator grip 15, the number of rotations of the crankshaft 26 in the engine 2 increases. In conjunction with this operation of the accelerator grip 15, the control part 10 controls the clutch actuator 33 to switch the state of the clutch 3 to a half-clutch state, to thereby transmit part of the rotation force generated in the engine 2 to the rear wheel 13R, and further to switch the state of the clutch 3 from the half-clutch state to an engaged state where the clutch 3 is engaged, to thereby transmit all the rotation force to the rear wheel 13R. The motorcycle 1 thereby smoothly starts with no clutch operation and subsequently accelerates. Then, after traveling at a constant speed, the driver reduces the vehicle speed of the motorcycle 1 and stops the motorcycle 1. In stopping the motorcycle 1, the control part 10 controls the clutch actuator 33 to switch the state of the clutch 3 from the engaged state to the half-clutch state, to thereby reduce the rotation force to be transmitted to the rear wheel 13R, and further switch the state of the clutch 3 from the half-clutch state to a disengaged state, to thereby cut off transmission of the rotation force and stop the motorcycle 1. The motorcycle 1 thereby smoothly stops with no clutch operation.

During the above acceleration and/or deceleration, the driver sometimes operates the shift pedal 45 to change the gear position of the manual transmission 4 as appropriate. In the present embodiment, as shown in FIG. 6, the traveling state of the motorcycle 1 is sectionalized into four operation ranges A to D on the basis of the content (shift-up operation/shift-down operation) of the shift operation by the driver and the traveling state (acceleration/deceleration) of the motorcycle 1. The control part 10 controls the constituent elements of the motorcycle 1 in accordance with the program, to thereby perform a gear shift operation suitable for each of the operation ranges A to D. More specifically, as shown in FIG. 7, when the control part 10 detects that the driver starts the shift operation on the basis of the information outputted from the shift rod sensor 461 (Step S101), the control part 10 determines which operation range among the four operation ranges A to D to which the traveling state of the motorcycle 1 belongs (Step S102). This determination is made from the viewpoint of whether the shift operation is the shift-up operation or the shift-down operation as described above and from the viewpoint of whether the motorcycle 1 is accelerating or decelerating.

Then, by executing Steps S103 to S110 of FIG. 7, the shift mode corresponding to the above determination result is selected and changing of the gear position of the manual transmission 4 is thereby smoothly performed. In this embodiment, as the shift mode, the following two modes are provided;

(1) The first shift mode: a mode in which an engine output is temporarily adjusted while the state of the clutch 3 is switched to the disengaged state, the half-clutch state, and the engaged state in this order.

(2) The second shift mode: a mode in which an engine output is temporarily adjusted while the clutch 3 is kept in the engaged state.

Note that the adjustment of the engine output means that an output of the engine 2 is increased by a predetermined amount or reduced by a predetermined amount with respect to the value corresponding to the accelerator opening.

When the control part 10 determines that the traveling state of the motorcycle 1 belongs to the operation range A ("YES" in Step S103), the control part 10 performs the above second shift mode (Step S107). When the shift-up operation is performed as the shift operation during acceleration of the motorcycle 1, the motorcycle 1 is in a state where the rotation force is transmitted from the engine 2 to the manual transmission 4, i.e., a drive state. Then, the control part 10 temporarily adjusts the output of the engine 2 while the clutch 3 is kept connected in the changing of the gear position. Specifically, the output of the engine 2 is reduced. A changing of the gear position without any clutch operation, i.e., the no-clutch operation is thereby performed. It is thereby possible to excellently control the changing of the gear position in the operation range A.

On the other hand, though there is a case where the shift-down operation is performed as the shift operation during acceleration of the motorcycle 1, in this case, it sometimes becomes hard to perform the no-clutch operation. Then, in the present embodiment, when the control part 10 determines that the traveling state of the motorcycle 1 belongs to the operation range B ("YES" in Step S104), the control part 10 performs the first shift mode (Step S108). Specifically, the control part 10 controls the clutch actuator 33 to switch the state of the clutch 3 from the engaged state to the disengaged state at the point in time when the above shift-down operation is started. It thereby becomes possible to smoothly perform the changing of the gear position during the shift-down operation. The control part 10 controls the clutch actuator 33 to switch the state of the clutch 3 from the disengaged state to the half-clutch state, and further to the engaged state. Thus, by performing a gear shift accompanied with the clutch control by the clutch actuator 33, it becomes possible to smoothly perform the changing of the gear position in the operation range B.

When the control part 10 determines that the traveling state belongs to the operation range C ("YES" in Step S105), the control part 10 performs the above second shift mode (Step S109). Specifically, when the shift-down operation is performed as the shift operation during deceleration of the motorcycle 1, the motorcycle 1 is in a state where the rotation force is transmitted from the manual transmission 4 to the engine 2, i.e., a driven state. Then, the control part 10 temporarily adjusts the output of the engine 2 while the clutch 3 is kept connected in the changing of the gear position. Specifically, the output of the engine 2 is increased and the no-clutch operation is performed. It is thereby possible to excellently control the changing of the gear position in the operation range C. Even when the traveling state belongs to the operation range C, there is not always the case where the output of the engine 2 is increased in the no-clutch operation as described above. Specifically, when a driving force transmitted from the drive wheel to a road surface is smaller than the road resistance receiving from the road surface, the motorcycle 1 reduces the speed. At that time, however, if the acceleration to reduce the speed is not so high, the rotation force is not transmitted from the manual transmission 4 to the engine 2 but transmitted from the engine 2 to the manual transmission 4. In the no clutch operation in this case, the output of the engine 2 is temporarily reduced.

On the other hand, though there is a case where the shift-up operation is performed as the shift operation during deceleration of the motorcycle 1. In this case, it sometimes becomes hard to perform the no-clutch operation, like in the case of the operation range B. Then, in the present embodiment, when the control part 10 determines that the traveling state belongs to the operation range D ("YES" in Step S106), the control part 10 performs the above first shift mode (Step S110). Specifically, the control part 10 controls the clutch actuator 33 to switch the state of the clutch 3 from the engaged state to the disengaged state at the point in time when the above shift-up operation is started. It thereby becomes possible to smoothly perform the changing of the gear position by the shift-up operation. The control part 10 controls the clutch actuator 33 to switch the state of the clutch 3 from the disengaged state to the half-clutch state, and further to the engaged state. Thus, by performing a gear shift accompanied with the clutch control by the clutch actuator 33, it becomes possible to smoothly perform the changing of the gear position in the operation range D.

Thus, in the first embodiment, the first shift mode and the second shift mode are provided as the shift mode corresponding to the shift operation of the driver. When the driver performs the shift operation, the shift mode is selected in accordance with the detection result on whether the shift operation is the shift-up operation or the shift-down operation, and the traveling state of the motorcycle 1. This eliminates the necessity of the driver's operation of a clutch lever, and it is possible to smoothly perform the changing of the gear position with excellent operability.

Further, in both the cases where the shift-down operation is performed as the shift operation during acceleration of the motorcycle 1 (operation range B) and where the shift-up operation is performed as the shift operation during deceleration of the motorcycle 1 (operation range D), the first shift mode is performed, and it is possible to smoothly perform the changing of the gear position in both the operation ranges B and D. Furthermore, since the engine output is temporarily adjusted concurrently with the gear shift accompanied with the clutch control by the clutch actuator 33 in the first shift mode, it is possible to prevent the vehicle speed of the motorcycle 1 from rapidly changing during the shift operation, and the operability of the motorcycle 1 is improved. Though the first shift mode is performed in both the operation ranges B and D herein, there may be a configuration where the first shift mode is performed only in either one of the operation ranges.

Further, in both the cases where the shift-up operation is performed as the shift operation during acceleration of the motorcycle 1 (operation range A) and where the shift-down operation is performed as the shift operation during deceleration of the motorcycle 1 (operation range C), the second shift mode is performed, and it is possible to smoothly perform the changing of the gear position in both the operation ranges A and C. Moreover, since the gear position is changed only by adjustment of the engine output in the second shift mode, it is possible to reduce the number of operations of the clutch actuator 33 and the clutch 3. Though the second shift mode is performed in both the operation ranges A and C herein, there may be a configuration where the second shift mode is performed only in either one of the operation ranges.

Further, though the clutch actuator 33 is controlled in accordance with the program to perform a clutch operation (engagement and disengagement of the clutch 3) at a timing set in advance in the present embodiment, the clutch operation can be performed at any timing other than the above one. In other words, the control part 10 is configured to receive a press of the clutch operation switch 63 and thereby operate the clutch actuator 33. Therefore, only if the driver presses the clutch operation switch 63 when he intends to perform the clutch operation, it is possible to accurately reflect the intention and further increase the operability of the motorcycle 1.

B. The Second Embodiment

Figure 8:
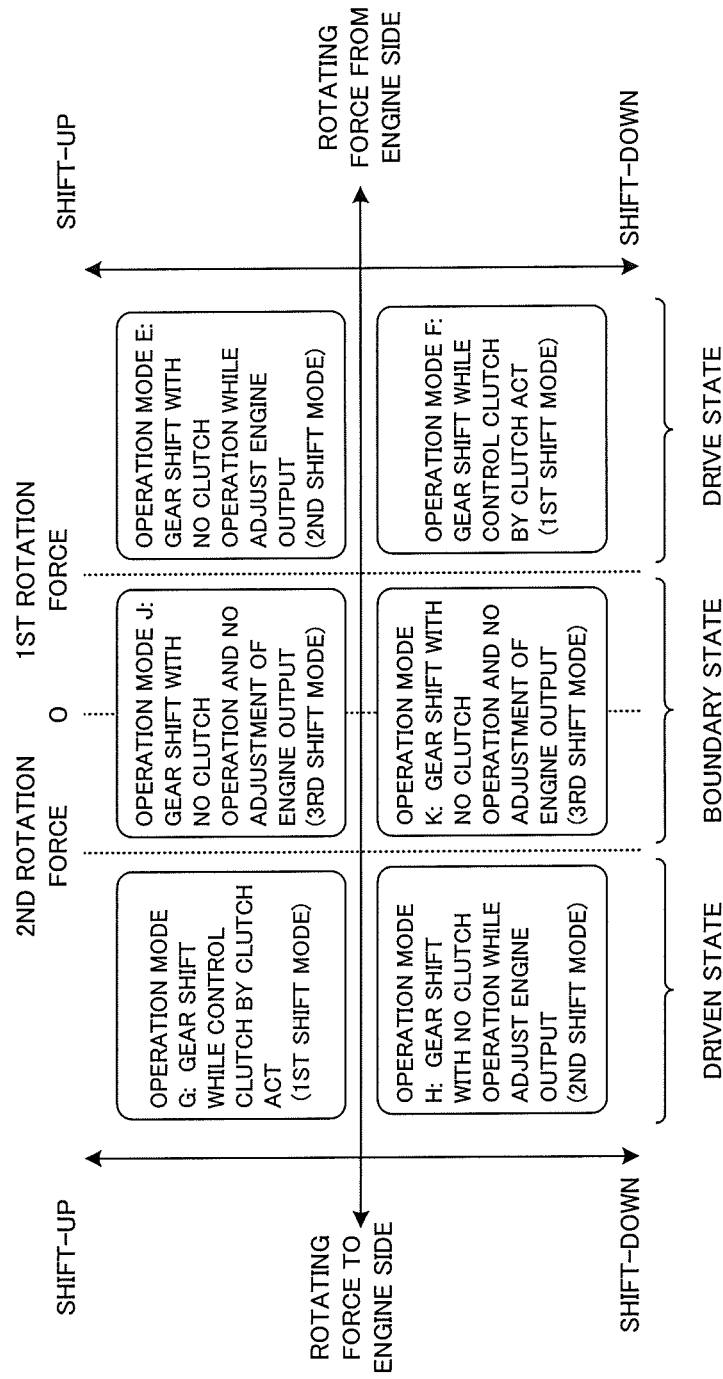
FIG. 8 is a view showing an exemplary sectionalization of the operation range in the second embodiment of the present invention.

Though the traveling state of the motorcycle 1 is sectionalized into four operation ranges A to D in the first embodiment, the sectionalization of the operation range is not limited to the above case. In the second embodiment, for example, as shown in FIG. 8, the traveling state of the motorcycle 1 is sectionalized into six operation ranges E to H, J, and K on the basis of the content (shift-up operation/shift-down operation) of the shift operation by the driver and the traveling state (drive state/boundary state/driven state) of the motorcycle 1. Then, the control part 10 controls the constituent elements of the motorcycle 1 in accordance with the program, to thereby perform a gear shift operation suitable for each of the operation ranges E to H, J, and K. Since a device configuration of the motorcycle 1 in accordance with the second embodiment is the same as that of the first embodiment, discussion will be made hereinafter, centering on the difference between the first and second embodiments.

FIG. 8 is a view showing an exemplary sectionalization of the operation range in the second embodiment of the present invention. In FIG. 8, the horizontal axis represents a rotation force, a "rotation force from the engine side" refers to a rotation force transmitted from the engine 2 to the manual transmission 4, and on the other hand, a "rotation force to the engine side" refers to a rotation force transmitted from the manual transmission 4 to the engine 2. As shown in FIG. 8, a "drive state" in the second embodiment refers to a state where a rotation force larger than a first rotation force is transmitted from the engine 2 to the manual transmission 4, a "driven state" refers to a state where a rotation force larger than a second rotation force is transmitted from the manual transmission 4 to the engine 2, and a "boundary state" refers to a state where a rotation force not larger than the first rotation force is transmitted from the engine 2 to the manual transmission 4 or another state where a rotation force not larger than the second rotation force is transmitted from the manual transmission 4 to the engine 2. Further, in the second embodiment, the control part 10 determines which state among the drive state, the driven state, and the boundary state where the motorcycle 1 is, on the basis of the detection result of the throttle opening sensor 25 and the crank angle sensor 261.

Figure 9:
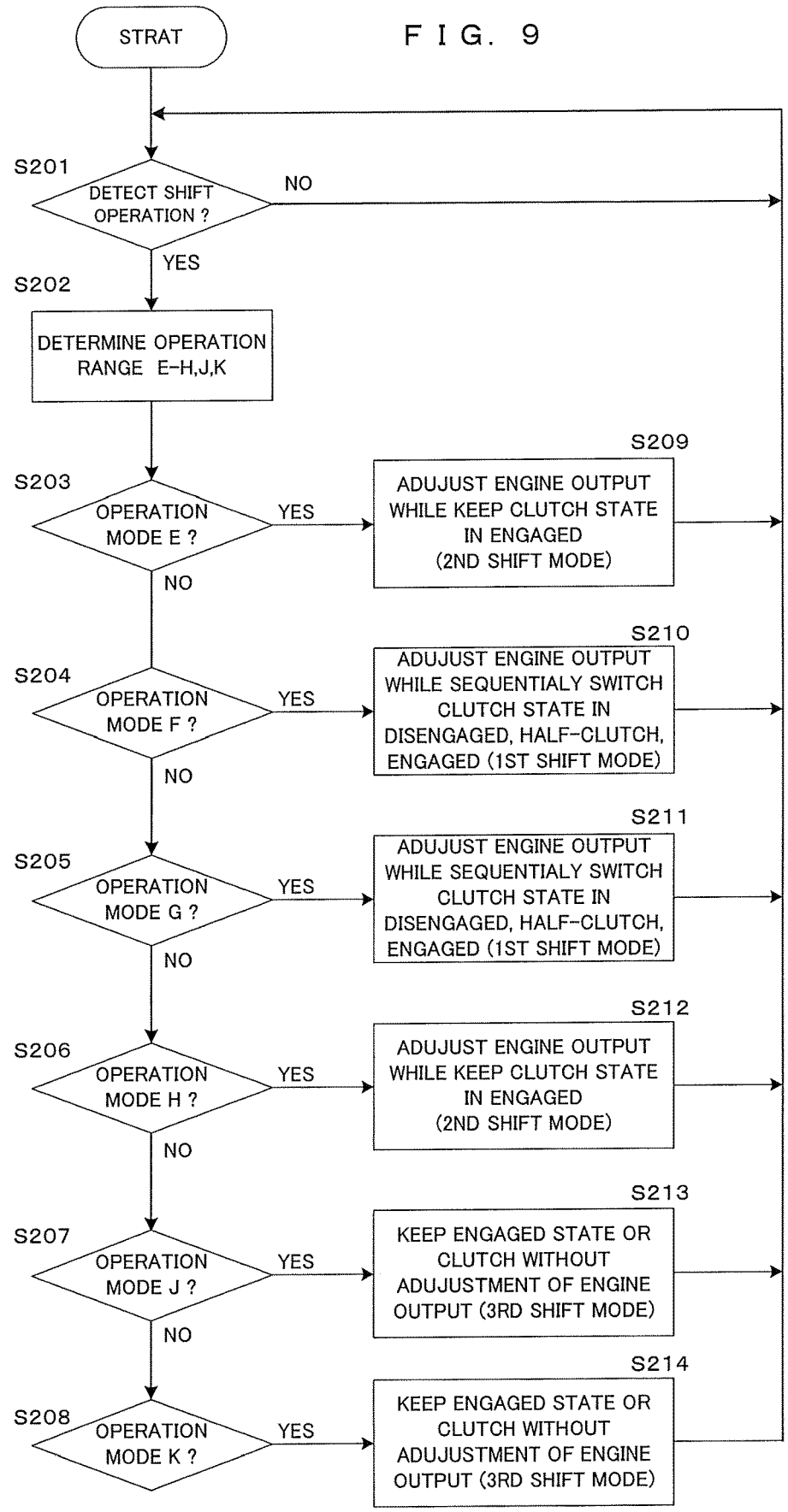
FIG. 9 is a flowchart showing the control of selecting the shift mode in accordance with a traveling state of the motorcycle in the second embodiment.

FIG. 9 is a flowchart showing the control of selecting the shift mode in accordance with a traveling state of the motorcycle in the second embodiment. In the second embodiment, the control part 10 controls the constituent elements of the motorcycle 1 in accordance with the program, to thereby perform a gear shift operation suitable for each of the operation ranges E to H, J, and K. More specifically, as shown in FIG. 9, when the control part 10 detects that the driver starts the shift operation on the basis of the information outputted from the shift rod sensor 461 (Step S201), the control part 10 determines to which operation range among the six operation ranges E to H, J, and K the traveling state of the motorcycle 1 belongs (Step S202). This determination is made from the viewpoint of whether the shift operation is the shift-up operation or the shift-down operation as described above and from the viewpoint of whether the motorcycle 1 is in the drive state, the driven state, or the boundary state.

Then, by executing Steps S203 to S214 of FIG. 9, the shift mode corresponding to the above determination result is selected and changing of the gear position of the manual transmission 4 is thereby smoothly performed. In this second embodiment, as the shift mode, besides the first shift mode and the second shift mode described above, provided is:

(3) The third shift mode: a mode in which the state of the clutch 3 is kept in the engaged state without any adjustment of the engine output.

When the control part 10 determines that the traveling state belongs to the operation range E ("YES" in Step S203) or the traveling state belongs to the operation range H ("YES" in Step S206), the control part 10 performs the above second shift mode (Step S209 or S212). Specifically, like in the cases of the operation ranges A and C in the first embodiment, the control part 10 temporarily adjusts the output of the engine 2 while the clutch 3 is kept connected in the changing of the gear position, to thereby perform the no-clutch operation. It is thereby possible to excellently control the changing of the gear position in the operation ranges E and H.

Further, when the control part 10 determines that the traveling state belongs to the operation range F ("YES" in Step S204) or the traveling state belongs to the operation range G ("YES" in Step S205), the control part 10 performs the above first shift mode (Step S210 or S211). Specifically, like in the cases of the operation ranges B and D in the first embodiment, the control part 10 temporarily adjusts the output of the engine 2 while controlling the clutch actuator 33 to switch the state of the clutch 3 to the disengaged state, the half-clutch state, and the engaged state in this order. Thus, by performing a gear shift accompanied with the clutch control by the clutch actuator 33, it is possible to excellently control the changing of the gear position in the operation ranges F and G.

Furthermore, when the control part 10 determines that the traveling state belongs to the operation range J ("YES" in Step S207) or the traveling state belongs to the operation range K ("YES" in Step S208), the control part 10 changes the gear position while keeping the state of the clutch 3 in the engaged state, without performing the adjustment of the engine output (the third shift mode). This is because the motorcycle 1 is in the boundary state in these operation ranges J and K, little rotation force is transmitted between the crankshaft 26 of the engine 2 and the main shaft 41 of the manual transmission 4, and no large pressure (engaging force) is generated in a contact surface between the dogs 47 and 48 provided in the gear of the manual transmission 4. For this reason, if the driver only operates the shift pedal 45, without performing either the adjustment of the engine output or the disengagement of the clutch 3, it is possible to easily move the gear to thereby switch the gear position.

Thus, also in the second embodiment like in the first embodiment, since the shift mode is selected in accordance with the detection result on whether the shift operation of the driver is the shift-up operation or the shift-down operation and the traveling state of the motorcycle 1, it is possible to eliminate the necessity of the driver's operation of the clutch lever and smoothly perform the changing of the gear position with excellent operability.

Further, in both the cases where the shift-down operation is performed in the drive state (operation range F) and where the shift-up operation is performed in the driven state (operation range G), the first shift mode is performed, and it is possible to smoothly perform the changing of the gear position in both the operation ranges F and G. Furthermore, since the engine output is temporarily adjusted concurrently with the gear shift accompanied with the clutch control by the clutch actuator 33 in the first shift mode, it is possible to prevent the vehicle speed of the motorcycle 1 from rapidly changing during the shift operation, and the operability of the motorcycle 1 is improved. Though the first shift mode is performed in both the operation ranges F and G herein, there may be a configuration where the first shift mode is performed only in either one of the operation ranges.

Further, in both the cases where the shift-up operation is performed in the drive state (operation range E) and where the shift-down operation is performed in the driven state (operation range H), the second shift mode is performed, and it is possible to smoothly perform the changing of the gear position in both the operation ranges E and H. Moreover, since the gear position is changed only by adjustment of the engine output in the second shift mode, it is possible to reduce the number of operations of the clutch actuator 33 and the clutch 3. Though the second shift mode is performed in both the operation ranges E and H herein, there may be a configuration where the second shift mode is performed only in either one of the operation ranges.

Furthermore, in both the cases where the shift-up operation is performed in the boundary state (operation range J) and where the shift-down operation is performed in the boundary state (operation range K), the third shift mode is performed, and it is possible to smoothly perform the changing of the gear position in both the operation ranges J and K. Moreover, since the gear position is changed in the state where the clutch 3 is connected in the third shift mode, it is possible to reduce the number of operations of the clutch actuator 33 and the clutch 3. Though the third shift mode is performed in both the operation ranges J and K herein, there may be a configuration where the third shift mode is performed only in either one of the operation ranges. Further, in the operation ranges J and K, the first shift mode or the second shift mode may be performed.

C. The Third Embodiment

As shown in FIG. 5, the gear position at a start of the motorcycle 1 is desired to be the first or the second, and there is a possibility that a start in a gear position (hereinafter, referred to as "high gear") higher than the first or second gear position may damage the clutch 3. Therefore, it is desirable to avoid this. There is a case, however, where the gear position of the motorcycle 1 at a stop is not suitable for a next start. In this case, it is preferable that the driver should perform a shift operation until the gear position becomes one suitable for the next start. In the present specification, such an operation of the driver for performing a shift operation during stopping to cause the gear position to be suitable for the next start is referred to as a "shift operation during stopping".

If there occurs a dog contact in the motorcycle 1 during stopping, it becomes hard to perform the shift operation during stopping. In the third embodiment of the present invention, the control part 10 controls the constituent elements of the motorcycle 1 in the following manner to assist the shift operation during stopping.

Figure 10:
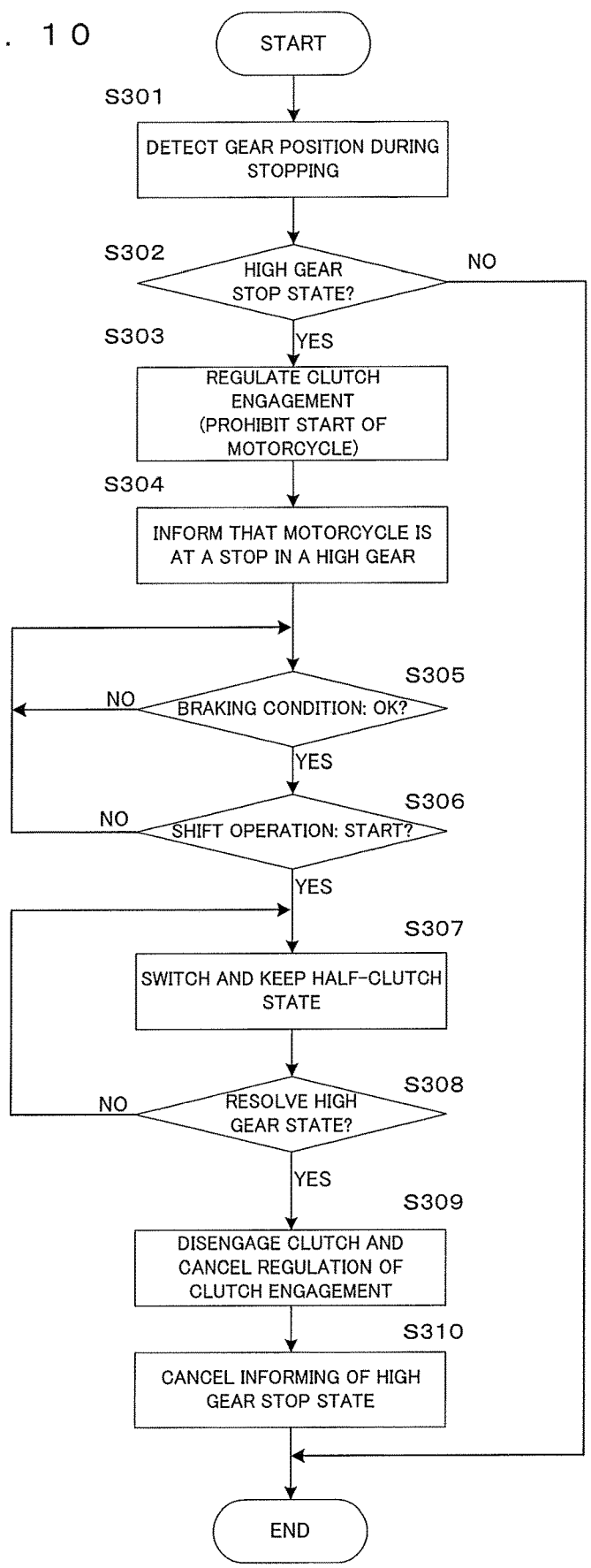
FIG. 10 is a flowchart showing an operation of the third embodiment.

FIG. 10 is a flowchart showing an operation of the third embodiment which is performed by the motorcycle in accordance with the present invention, i.e., an operation for assisting the shift operation during stopping. When the motorcycle 1 stops, the control part 10 acquires a gear position during stopping on the basis of the detection result (which corresponds to exemplary "gear information" of the present invention) of the shift cam rotation angle sensor 441 (Step S301). Then, when the control part 10 determines that the gear position during stopping is higher than the second stage and is in a so-called high gear stop state ("YES" in Step S302), the control part 10 performs a series of process steps for assisting the shift operation during stopping (Steps S303 to S310).

The control part 10 regulates the engagement of the clutch 3, to thereby prohibit the start of the motorcycle 1 (Step S303). The control part 10 uses the information lamp 17 to inform the driver that the motorcycle 1 is at a stop in a high gear (Step S304). Other than this method, for example, an informing method using voice and sound, and the like, may be used. As a matter of course, various informing methods may be combined.

In next Step S305, the control part 10 determines whether a braking condition is satisfied or not. This "braking condition" means that the driver operates at least one of the brake lever 16 and the brake pedal 20 and a brake mechanism of the motorcycle 1 thereby works. This condition is made by considering that the clutch 3 is temporarily brought into the half-clutch state in order to surely resolve the dog contact as described later.

When the control part 10 confirms that the braking condition is satisfied in Step S306, the control part 10 determines, on the basis of the information outputted from the shift rod sensor 461, whether the driver starts the shift operation or not (Step S306). Then, after the driver starts the shift operation under operation of the brake mechanism ("YES" in both Steps S305 and S306), the control part 10 controls the clutch actuator 33 to switch the state of the clutch 3 to the half-clutch state and keep the state (Step S307). Part of the rotation force from the engine 2 is thereby given to the main shaft 41 of the manual transmission 4, and even if the dog contact occurs at the point in time when the motorcycle 1 stops, the dog contact is resolved and the shift-down operation is performed when the driver performs the shift operation. This half-clutch state is kept while the high gear state is not resolved ("NO" in Step S308).

On the other hand, when the high gear state is resolved ("YES" in Step S308), the control part 10 controls the clutch actuator 33 to switch the state of the clutch 3 to the disengaged state and cancel the regulation of the engagement of the clutch 3 (Step S309). The control part 10 controls the information lamp 17 to cancel the informing that the motorcycle 1 is at a stop in a high gear and inform the driver that the gear position becomes one suitable for the next start and the motorcycle 1 becomes to be able to start (Step S310).

Thus, in the third embodiment, when the gear position of the manual transmission 4 during stopping of the motorcycle 1 is not suitable for the next start, the engagement of the clutch 3 is regulated and the start of the motorcycle 1 is thereby prohibited, and that is informed by using the information lamp 17. For this reason, it is possible to surely prevent the start of the motorcycle 1 at an inappropriate gear position. Further, it is possible to accurately inform the driver of that matter.

Since the state of the clutch 3 is changed to the half-clutch state under the situation where the brake mechanism applies a braking force to the motorcycle 1 so as to regulate the movement of the motorcycle 1, it is possible to surely prevent the dog contact while the motorcycle 1 is kept at a stop and smoothly perform the shift-down operation. As a result, it is possible to further improve the operability.

Furthermore, when it is confirmed that the gear position during stopping becomes one suitable for the next start, the regulation of the engagement of the clutch 3 is cancelled and the informing thereon is cancelled. As a result, recognizing that the gear position during stopping becomes one suitable for the next start, the driver can smoothly start the motorcycle 1.

D. The Fourth Embodiment

Though the driver is required to perform a braking operation in order to regulate the movement of the motorcycle 1 while the attempt is made to resolve the high gear state by the shift-down operation during stopping in the third embodiment, the operation of resolving the high gear state by the driver may be assisted under an automatic braking operation, instead of the braking operation (the fourth embodiment). This produces the same operation and effect as those of the third embodiment. Specifically, there may be a configuration where an automatic brake mechanism (not shown) for applying a braking force to at least one of the front wheel 13F and the rear wheel 13R so as to regulate the movement of the motorcycle 1 in accordance with a brake command from the control part 10 is further provided and the control part 10 controls the constituent elements of the motorcycle 1 as indicated by the flowchart of FIG. 11.

Figure 11:
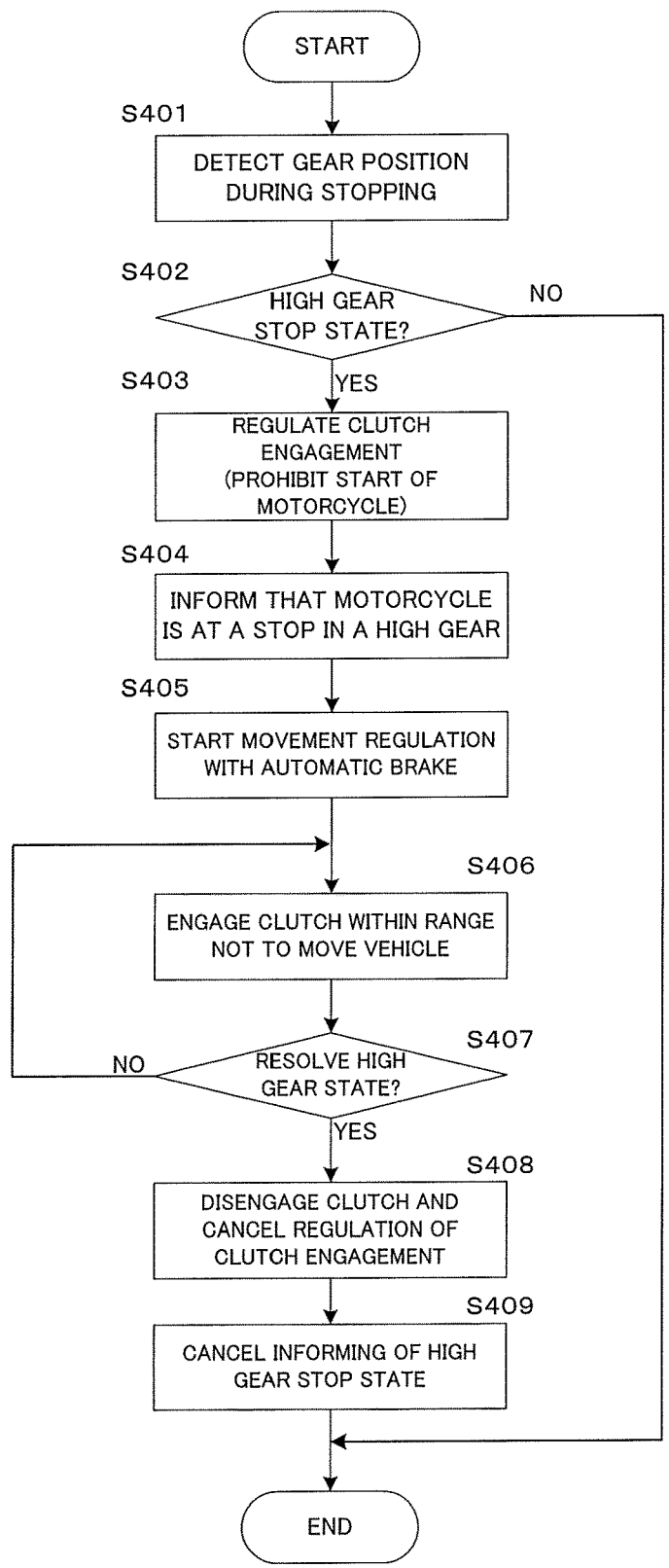
FIG. 11 is a flowchart showing an operation of the fourth embodiment.

FIG. 11 is a flowchart showing an operation of the fourth embodiment which is performed by the motorcycle in accordance with the present invention, i.e., an operation for assisting the shift operation during stopping. Like in the third embodiment, when the motorcycle 1 stops, the control part 10 acquires the gear position during stopping (Step S401). Then, when the control part 10 determines that the gear position during stopping is in the high gear stop state ("YES" in Step S402), the control part 10 performs a series of process steps for assisting the shift operation during stopping (Steps S403 to S409).

Like in the third embodiment, the control part 10 regulates the engagement of the clutch 3, to thereby prohibit the start of the motorcycle 1 (Step S403), and further the control part 10 uses the information lamp 17 to inform the driver that the motorcycle 1 is at a stop in a high gear (Step S404).

In next Step S405, the control part 10 operates the automatic brake mechanism to start movement regulation of the motorcycle 1. Subsequently, the control part 10 controls the clutch actuator 33 to engage the clutch 3, to thereby transmit part of the rotation force from the engine 2 to the manual transmission 4 (Step S406). The engagement, however, is set to a degree not to move the motorcycle 1. By this clutch engagement, the dog contact is resolved while the motorcycle 1 is kept at a stop, and it becomes possible for the driver to smoothly switch the gear position.

The control part 10 continues the above clutch engagement until the high gear state is resolved. Then, when the control part 10 confirms in Step S407 that the high gear state is resolved, the control part 10 controls the clutch actuator 33 to disengage the clutch 3 and then cancels the regulation of the engagement of the clutch 3 set in Step S403 and the regulation of the movement of the motorcycle 1 set in Step S405 (Step S408). Furthermore, the control part 10 controls the information lamp 17 to cancel the informing that the motorcycle 1 is at a stop in a high gear and inform the driver that the gear position becomes one suitable for the next start and the motorcycle 1 becomes to be able to start (Step S409).

E. Others

The present invention is not limited to the above-described embodiments, but numerous modifications and variations other than those described above can be devised without departing from the scope of the invention. Though a load cell is used as the shift rod sensor 461 for detecting a shift operation by the driver in the embodiments, for example, a switch which starts operating by a shift operation or a sensor which detects a stroke of the operation may be used.

Further, though the acceleration and deceleration of the motorcycle 1 is determined from the vehicle speed in the embodiments, this may be determined from the throttle opening and the engine rotation speed.

Though the state of the clutch 3 is changed to the half-clutch state with the start of the shift-down operation as a trigger in the third embodiment, a dedicated button therefor may be additionally provided.

Though the present invention is applied to the motorcycle 1 equipped with the engine 2 as the prime mover in the embodiments, the present invention may be applied to a motorcycle which travels with a rotation force generated by any other prime mover, such as a motor. Further, a vehicle to which the present invention can be applied is not limited to a motorcycle, but the present invention can be applied to vehicles, in general, which transmit a rotation force outputted from a prime mover to a drive wheel through a manual transmission.

Thus, in the embodiments, the clutch 3, the clutch actuator 33, and the control part 10 serve as a "control system" of the present invention. The power transmission path 5 corresponds to an exemplary "transmission path of the rotation force". The "first rotation force" and the "second rotation force" in FIG. 8 correspond to respective examples of a "first value" and a "second value" of the present invention. The rear wheel 13R corresponds to an exemplary "drive wheel" of the present invention. The front wheel brake 18, the rear wheel brake and the automatic brake mechanism, which has a function of applying braking force to the traveling motorcycle 1 or the vehicle to regulate the movement thereof, correspond to an example of a "brake mechanism" of the present invention.

Thus, as described above, exemplarily showing specific embodiments, the present invention may be configured, for example, so that the control part selects the first shift mode in at least one of the cases where the shift-down operation is performed as the shift operation during acceleration of the vehicle and where the shift-up operation is performed as the shift operation during deceleration of the vehicle, and it is thereby possible to smoothly change the gear position.

The present invention may be configured so that the control part selects the first shift mode in at least one of the cases where the shift-down operation is performed as the shift operation in the drive state in which a rotation force larger than the first value is transmitted from the prime mover to the manual transmission and where the shift-up operation is performed as the shift operation in the driven state in which a rotation force larger than the second value is transmitted from the manual transmission to the prime mover, and it is thereby possible to smoothly switch the gear position.

Furthermore, the present invention may be configured so that the clutch is kept in the engaged state without any adjustment of the output of the prime mover in the case where the shift operation is performed in the boundary state in which a rotation force not larger than the first value is transmitted from the prime mover to the manual transmission or a rotation force not larger than the second value is transmitted from the manual transmission to the prime mover. Specifically, in the boundary state, since the rotation force transmitted between the input side (prime mover side) and the output side (drive wheel side) of the manual transmission is small, the output adjustment of the prime mover is not needed, and it is possible to prevent any shock accompanying the output adjustment from occurring in the vehicle. As a result, it is possible to increase the operability of the vehicle.

The present invention may be configured so that the control part selects the second shift mode in both the cases where the shift-up operation is performed as the shift operation during acceleration of the vehicle and where the shift-down operation is performed as the shift operation during deceleration of the vehicle. Specifically, in the above cases, it is possible to smoothly switch the gear position only with the output adjustment of the prime mover and to reduce the number of operations of the clutch actuator and the clutch.

There may be a configuration where a command switch for receiving a clutch command relating to the engagement and disengagement of the clutch from the driver is provided and the control part controls the clutch actuator to switch between the engagement and the disengagement of the clutch in accordance with the clutch command received by using the command switch. With this configuration, when the driver intends to perform the clutch operation, it is possible to accurately reflect the intention and further increase the operability of the vehicle.

There may be another configuration where gear information relating to the gear position of the manual transmission during stopping of the vehicle is acquired and when it is determined, on the basis of the gear information, that the gear position during stopping is not suitable for a next start, the control part controls the clutch actuator so as to regulate the engagement of the clutch and prohibit the vehicle from starting, and informs the driver that the vehicle is prohibited from starting. It is thereby possible to surely prevent the start of the vehicle at an inappropriate gear position and accurately inform the driver of that matter.

There may be still another configuration where a brake mechanism that applies a braking force to the vehicle by a braking operation of the driver is provided and the control part controls the clutch actuator to switch the state of the clutch to the half-clutch state in the case where the movement of the vehicle is regulated by the brake mechanism and the shift-down operation is started as the shift operation. The state of the clutch is thereby changed to the half-clutch state in response to the shift-down operation of the driver during stopping and the changing of the gear position is smoothly performed. Further, in the changing of the gear position, though part of the rotation force is transmitted from the prime mover to the manual transmission by switching to the half-clutch state, the changing of the gear position can be smoothly performed while the vehicle is kept at a stop by the regulation of the movement of the vehicle with the brake mechanism. As a result, it is possible to further improve the operability.

There may be yet another configuration where a brake mechanism that applies a braking force to the vehicle in accordance with the brake command from the control part is provided, and the control part controls the brake mechanism to brake the movement of the vehicle and, to engage the clutch, controls the clutch actuator, within a range, to not move the vehicle. In the configuration, it is thereby possible to smoothly switch the gear position while the vehicle is kept at a stop and to further improve the operability.

Furthermore, there may be a configuration where when the control part confirms that the gear position during stopping becomes one suitable for a next start, the control part controls the clutch actuator to disengage the clutch, cancels the regulation of the engagement of the clutch, and cancels the informing that the start is being regulated. The driver can thereby recognize that the gear position during stopping becomes one suitable for the next start and smoothly start the vehicle.

The present invention can be applied to a vehicle which travels by transmitting a rotation force outputted from an engine to a drive wheel through a manual transmission that changes a gear position by a shift operation of a driver, and a control system which controls the vehicle, in general.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A control system of a vehicle which transmits a rotation force outputted from a prime mover to a drive wheel through a manual transmission that changes a gear position by a shift operation of a driver, comprising:
   a clutch provided between the prime mover and the manual transmission in a transmission path of the rotation force;
   a clutch actuator that engages and disengages the clutch; and
   a control processor that controls the clutch actuator to switch between an engaged state where the clutch is engaged and a disengaged state where the clutch is disengaged,
   wherein the control processor is configured to perform operations in multiple modes, including:
   a first shift mode in which the clutch is switched to the disengaged state before changing of the gear position and the clutch is switched to the engaged state after changing of the gear position; and
   a second shift mode in which an output of the prime mover is adjusted while the clutch is kept in the engaged state during the shift operation;
   wherein either the first shift mode or the second shift mode is selected on the basis of a detection result on whether the shift operation is a shift-up operation or a shift-down operation, and a traveling state of the vehicle;
   wherein the control processor selects the first shift mode in at least one of cases where a shift-down operation is performed as the shift operation in a drive state and where a shift-up operation is performed as the shift operation in a driven state, the drive state being a state where a rotation force larger than a first value is transmitted from the prime mover to the manual transmission, and the driven state being a state where a rotation force larger than a second value is transmitted from the manual transmission to the prime mover; and
   wherein
   the control processor keeps the clutch in the engaged state without adjusting an output of the prime mover in a case where the shift operation is performed in a boundary state where a rotation force not larger than the first value is transmitted from the prime mover to the manual transmission or a rotation force not larger than the second value is transmitted from the manual transmission to the prime mover.

2. A control system of a vehicle which transmits a rotation force outputted from a prime mover to a drive wheel through a manual transmission that changes a gear position by a shift operation of a driver, comprising:
   a clutch provided between the prime mover and the manual transmission in a transmission path of the rotation force;
   a clutch actuator that engages and disengages the clutch; and
   a control processor that controls the clutch actuator to switch between an engaged state where the clutch is engaged and a disengaged state where the clutch is disengaged,
   wherein the control processor is configured to perform operations in multiple modes, including:
   a first shift mode in which the clutch is switched to the disengaged state before changing of the gear position and the clutch is switched to the engaged state after changing of the gear position; and
   a second shift mode in which an output of the prime mover is adjusted while the clutch is kept in the engaged state during the shift operation,
   wherein either the first shift mode or the second shift mode is selected on the basis of a detection result on whether the shift operation is a shift-up operation or a shift-down operation, and a traveling state of the vehicle, and wherein
   the control processor acquires gear information relating to a gear position of the manual transmission during stopping of the vehicle; and
   when the control processor determines, on the basis of the gear information, that the gear position during stopping is not suitable for a next start, the control processor controls the clutch actuator so as to regulate engagement of the clutch, to thereby regulate a start of the vehicle, and informs that it is in a state where the start of the vehicle is regulated.

3. The control system according to claim 2, further comprising:
a brake mechanism that applies a braking force to the vehicle by a braking operation of the driver,
wherein when the braking force is applied by the brake mechanism and a shift-down operation is started as the shift operation, the control processor controls the clutch actuator to switch the clutch to a half-clutch state.

4. The control system according to claim 3, wherein after the control processor confirms that the gear position during stopping is changed to a gear position suitable for the next start, the control processor controls the clutch actuator to disengage the clutch, cancels regulation of the engagement of the clutch, and cancels the informing.

5. The control system according to claim 2, further comprising:
a brake mechanism that applies a braking force to the vehicle in accordance with a brake command from the control processor,
wherein the control processor controls the brake mechanism to apply the braking force, and, to engage the clutch, controls the clutch actuator, within a range, to not rotate the drive wheel.

6. The control system according to claim 5, wherein after the control processor confirms that the gear position during stopping is changed to a gear position suitable for the next start, the control processor controls the clutch actuator to disengage the clutch, cancels regulation of the engagement of the clutch, and cancels the informing.

* * * * *